United States Patent Office 3,067,247
Patented Dec. 4, 1962

---

3,067,247
PROCESS FOR PREPARING L(+)-3,5-DIIODOTHYRONINE
Walter Siedel, Bad Soden, Taunus, and Helmut Nahm and Johann König, Frankfurt am Main, Germany, assignors to Farbwerke Hoechst Aktiengesellschaft vormals Meister Lucius & Brüning, Frankfurt am Main, Germany, a corporation of Germany
No Drawing. Filed Aug. 4, 1959, Ser. No. 831,474
Claims priority, application Germany Aug. 19, 1958
3 Claims. (Cl. 260—519)

It is already known to resolve into its optically active antipodes the racemic mixture of D(—)- and L(+)-3,5-diiodothyronine formed in the synthesis of diiodothyronine by treatment with formic acid and reaction of the mixture consisting of D(—)- and L(+)-N-formyl-3,5-diiodothyronine thus obtained by means of alpha-phenylethylamine. (Cf. Harington et al., Biochem. J. 22, page 1430 (1928).)

As shown by the optical rotation of the final product with $$[\alpha]^{21°}_{5461\,A.} = +27.8°$$

there resulted, according to the prescription made by Harington et al., a preparation only enriched by L(+)-N-formyl-3,5-diiodothyronine. In the above-mentioned literature citation it is distinctly stated that the racemate cannot be separated by means of brucine, strychnine and cinchonine since the salts formed thereby are insoluble in water and only sparingly soluble in absolute alcohol; from aqueous or alcoholic solutions the salts are obtained only in an oily condition.

After A. Canzanelli, C. R. Harington and S. S. Randall had proved (cf. Biochem. J. 28, page 68 (1934)) that the 3,5-diiodothyronine dextrorotatory in ethanol possesses the natural L-configuration, efforts were made to prepare this compound in utmost purity.

Now we have found that L(+)-3,5-diiodothyronine can be obtained in excellent purity by adding brucine to D,L-N-formyl-3,5-diiodothyronine in isopropanol, separating from the solution the salt pair of D(—)-N-formyl-3,5-diiodothyronine-brucine which has been formed and which is sparingly soluble, evaporating the solution to dryness, decomposing the residue obtained in the form of the diastereoisomeric, easily soluble salt pair L(+)-N-formyl-3,5-diiodothyronine-brucine by means of alkalies and eliminating the formyl radical by treatment with hydrohalic acid.

The D,L-N-formyl-3,5-diiodothyronine required as starting material can be prepared by reaction of D,L-3,5-diiodothyronine with anhydrous formic acid in the presence of acetic anhydride.

According to the process of the invention it is favorable to operate in such a manner that equimolar amounts of D,L-N-formyl-3,5-diiodothyronine as well as of brucine are dissolved in boiling anhydrous isopropanol and that both the solutions are united. There is soon formed a clear solution from which, upon further heating, the D(—)-N-formyl-3,5-diiodothyronine/brucine salt completely separates after several hours; the salt is isolated and decomposed by means of alkalies into brucine and D(—)-N-formyl-3,5-diiodothyronine. The filtrate obtained is evaporated to dryness. The residue constituting the L(+)-N-formyl-3,5-diiodothyronine/brucine salt is likewise decomposed by means of alkalies into brucine and L(+)-N-formyl-3,5-diiodothyronine. After separation of the formyl-group by means of aqueous hydrohalic acid, for example hydrochloric acid, hydrobromic acid, hydroiodic acid, preferably hydrobromic acid, the desired L(+)-3,5-diiodothyronine is obtained in a very pure state. The yield amounts to 75–80% of the theory.

As alkalies there enter into consideration dilute ammonia solution, 1 N-sodium hydroxide solution and 1-N-potassium hydroxide solution.

The succeeding of the reaction was surprising since Harington et al. expressly stated that resolving of the DL-3,5-diiodothyronine into its optically active antipodes by means of the bases brucine, strychnine or cichonine in aqueous-alcoholic or absolutely alcoholic solution could not be carried out.

When treating the D(—)-N-formyl-3,5-diiodothyronine obtained as by-product by means of hot alkali metal hydroxide solution racemization is attained simultaneously with the elimination of the formyl group. The D,L-3,5-diiodothyronine thus obtained can again be subjected to the separation into its optically active antipodes according to the process of the present invention.

The product obtained by this process is a chemical substance already known and possesses itself therapeutical properties or forms an appreciated intermediate product for the preparation of pharmaceutically interesting compounds, for example for the preparation of triiodothyronine and/or thyroxine. (Cf. for instance, Selenkow et al., Physiological Reviews, vol. 35 (April 1955), pages 449 and 450.)

The following examples serve to illustrate the invention but they are not intended to limit it thereto:

EXAMPLE

(a) D,L-N-Formyl-3,5-Diiodothyronine

To a mixture of 500 cc. of anhydrous formic acid and 50 cc. of acetic anhydride there are added, while stirring at room temperature, 100 grams of D,L-3,5-diiodothyronine. A clear solution is soon formed from which after standing for several hours the D,L-N-formyl-3,5-diiodothyronine is crystallized out. Together with the product isolated from the concentrated mother liquor 95 grams of D,L-N-formyl-3,5-diiodothyronine are obtained, melting at 225–230° C. (with decomposition).

(b) L(+)-N-Formyl-3,5-Diiodothyronine

The crude D,L-N-formyl-3,5-diiodothyronine prepared from 350 grams of D,L-3,5-diiodothyronine is heated on the steam bath in 1500 cc. of anhydrous isopropanol. To this suspension is added a boiling solution of 300 grams of anhydrous brucine in 1500 cc. of anhydrous isopropanol. Upon prolonged boiling there is separated from the solution which has become temporarily clear, the D(—)-N-formyl-3,5-diiodothyronine/brucine salt. The separation is terminated after about 8 hours. It is filtered off with suction in a still hot state and washed with isopropanol. The yield amounts to 381 grams.

The mother liquor is then evaporated to dryness under reduced pressure. The residue is taken up in 1000 cc. of 1 N-ammonia solution and the brucine is removed by a three times' shaking with 300 cc. of chloroform each time. Upon acidification, while cooling, of the ammonia solution with hydrochloric acid to a pH-value of 1–2 the L(+)-N-formyl-3,5-diiodothyronine separates out; it is obtained primarily in the form of resin, but soon becomes crystalline. Upon filtering with suction and washing with water it is dried. The yield amounts to 146 grams. The substance melts at 186° 7. (with decomposition). When recrystallized from isopropanol/water it shows the specific rotation: $[\alpha]_D^{23} = +43.8°$ ($\alpha = +2.19°$; 1 dm.; 200 milligrams in 4 ml. of ethanol of 95% strength).

(c) L(+)-3,5-Diiodothyronine 74.3 grams of L(+)-N-formyl-3,5-diiodothyronine are heated to boiling for 2 hours under reflux with 750 cc. of a mixture consisting of hydrobromic acid of 48% strength and water in a ratio of 1:2. A clear solution is formed from which, upon cooling, the hydrobromic acid salt of L(+)-3,5-diiodothyronine separates off. After filtering with suction it is suspended in hot water and saturated sodium acetate solution is added until a pH-value of 6 is obtained. The separated L(+)-3,5-diiodothyronine is filtered with suction when still hot and washed with water, methanol and acetone. Yield: 61.3 grams. The specific rotation amounts to $[\alpha]_D^{25} = +25.2°$ ($\alpha = +1.26°$; 1 dm.; 200 mg. in 4 ml. of a mixture of 1 N-hydrochloric acid in ethanol of 95% strength in a ratio of 1:2).

We claim:

1. Process for preparing L(+)-3,5-diiodothyronine from a racemic mixture of D(−)- and L(+)-N-formyl-3,5-diiodothyronine which comprises dissolving said racemic mixture in anhydrous isopropanol heated to the boiling point, adding to the resulting solution an at least equimolar amount of brucine for forming a crystallized D(−)-N-formyl-3,5-diiodothyronine/brucine salt and an L(+)-N-formyl-3,5-diiodothyronine/brucine salt solution in isopropanol, separating the crystallized salt from said solution, evaporating the solution to dryness to crystallize a diastomeric L(+)-N-formyl-3,5-diiodothyronine/brucine salt, decomposing the diastomeric salt into its components by treatment with a dilute solution of an inorganic base of the group consisting of ammonia and alkali metal hydroxides, and hydrolyzing the resulting L(+)-N-formyl-3,5-diiodothyronine to the desired L(+)-3,5-diiodothyronine by treatment with a hydrohalic acid of the group consisting of hydrochloric acid, hydrobromic acid and hydroiodic acid.

2. The method defined in claim 1 wherein the inorganic base is ammonia.

3. The method defined in claim 1 wherein the hydrohalic acid is hydrobromic acid.

References Cited in the file of this patent

UNITED STATES PATENTS

| 2,543,358 | Vigneaud | Feb. 27, 1951 |
| 2,727,063 | Jacob | Dec. 13, 1955 |

OTHER REFERENCES

West et al.: "Jour. of Bio. Chem.," vol. 119 (1937), pp. 111, and 116–119. (Copy in Scientific Library.)